US012659535B2

(12) United States Patent　　　　(10) Patent No.:　　US 12,659,535 B2
Cerafogli et al.　　　　　　　　　　(45) Date of Patent:　　　Jun. 16, 2026

(54) INTELLIGENT INTERACTIVE VIDEO CONTENT BASED ON CONTEXTUAL AWARENESS FOR MOBILE APPLICATIONS

(71) Applicant: Micron Technology, Inc., Boise, ID (US)

(72) Inventors: Chiara Cerafogli, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 88 days.

(21) Appl. No.: 18/223,932

(22) Filed: Jul. 19, 2023

(65) Prior Publication Data

US 2024/0048788 A1　　Feb. 8, 2024

Related U.S. Application Data

(60) Provisional application No. 63/394,539, filed on Aug. 2, 2022.

(51) Int. Cl.
　　*H04N 21/2668*　　(2011.01)
　　*H04N 21/234*　　(2011.01)
　　*H04N 21/25*　　(2011.01)
　　*H04N 21/258*　　(2011.01)
　　*H04N 21/845*　　(2011.01)

(52) U.S. Cl.
　　CPC ... *H04N 21/2668* (2013.01); *H04N 21/23418* (2013.01); *H04N 21/251* (2013.01); *H04N 21/25891* (2013.01); *H04N 21/8456* (2013.01)

(58) Field of Classification Search
　　None
　　See application file for complete search history.

(56) References Cited

U.S. PATENT DOCUMENTS

| | | | |
|---|---|---|---|
| 2018/0316948 A1* | 11/2018 | Todd | H04N 21/4312 |
| 2022/0053042 A1* | 2/2022 | Kanza | H04N 21/25841 |
| 2023/0007344 A1* | 1/2023 | Sahasi | H04N 21/252 |

* cited by examiner

*Primary Examiner* — James R Marandi

(74) *Attorney, Agent, or Firm* — Lowenstein Sandler LLP

(57)　　　　　ABSTRACT

Processing logic receives an indication of at least one of content preferences or contextual information associated with a request to view a media content stream and controls one or more parameters of the media content stream according to the at least one of the content preferences or contextual information to create a personalized media content stream. The processing logic further provides the personalized media content stream to a user device.

18 Claims, 5 Drawing Sheets

100

Server 120B

Content Filtering Engine 113

Memory Sub-System 110B

User Profile Data 180

Personalized Content Stream 185

Network 150

120A

110A

160

300

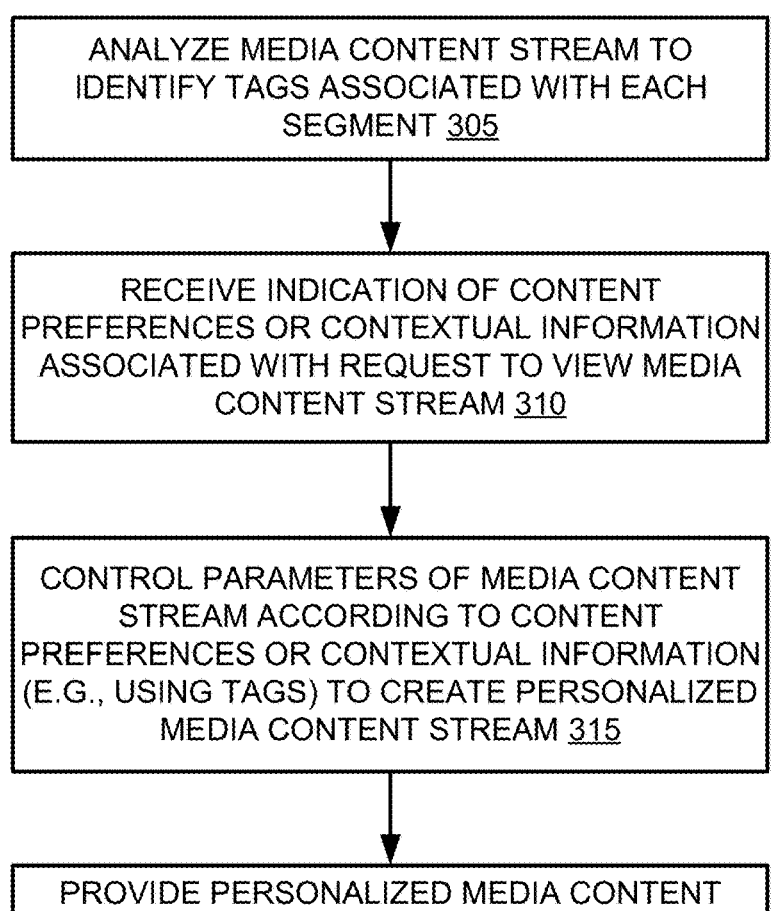

ANALYZE MEDIA CONTENT STREAM TO IDENTIFY TAGS ASSOCIATED WITH EACH SEGMENT <u>305</u>

RECEIVE INDICATION OF CONTENT PREFERENCES OR CONTEXTUAL INFORMATION ASSOCIATED WITH REQUEST TO VIEW MEDIA CONTENT STREAM <u>310</u>

CONTROL PARAMETERS OF MEDIA CONTENT STREAM ACCORDING TO CONTENT PREFERENCES OR CONTEXTUAL INFORMATION (E.G., USING TAGS) TO CREATE PERSONALIZED MEDIA CONTENT STREAM <u>315</u>

PROVIDE PERSONALIZED MEDIA CONTENT STREAM TO USER DEVICE <u>320</u>

FIG. 3

INTELLIGENT INTERACTIVE VIDEO CONTENT BASED ON CONTEXTUAL AWARENESS FOR MOBILE APPLICATIONS

RELATED APPLICATIONS

This application is a continuation of U.S. Patent Application No. 63/394,539, filed Aug. 2, 2022, the entire contents of which are hereby incorporated by reference herein.

TECHNICAL FIELD

Embodiments of the disclosure relate generally to content distribution systems, and more specifically, relate to intelligent interactive video content based on contextual awareness for mobile applications.

BACKGROUND

A large and growing population of users enjoys entertainment through the consumption of media items, including electronic media, such as digital audio and video. Users employ various electronic devices to consume such media items. Among these electronic devices are electronic book readers, cellular telephones, personal digital assistants (PDAs), portable media players, tablet computers, electronic pads, netbooks, desktop computers, notebook computers, virtual reality (VR) or augmented reality (AR) headsets, and the like. Media content suppliers provide media items to consumers through a variety of means. Some media content suppliers deliver media items in single units, others in bulk, others through some linear streaming experience, and others by providing playlists or manifest files of media segments or chunks. Some media content suppliers employ a variety of delivery means.

BRIEF DESCRIPTION OF THE DRAWINGS

The present disclosure will be understood more fully from the detailed description given below and from the accompanying drawings of various embodiments of the disclosure.

FIG. 3 is a flow diagram of an example method of intelligent interactive video content distribution based on contextual awareness in accordance with some embodiments of the present disclosure.

DETAILED DESCRIPTION

Figure 1:
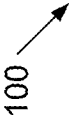
FIG. 1 is a block diagram of an exemplary network architecture in which embodiments of the present disclosure may operation.

Aspects of the present disclosure are directed to intelligently providing interactive video content based on contextual awareness for mobile applications. A media content provider or media delivery service can include, for example, an Internet service provider, cable company, production company, web site provider, social media web site, music or video web site, telecommunications company, over-the-top content provider, cloud DVR company, or other provider. Such a media content provider can produce media content, such as video and/or audio content, related to a particular event, for example. Such an event could include a newsworthy event, such as a speech, protest, gathering, ceremony, program, etc. In conventional circumstances, the media content provider may produce a single content stream which is delivered to the users (e.g., customers, subscribers, or other viewers). The single content stream can be generated by selectively controlling various parameters of the content stream (e.g., camera angles, specific video shots, language, audio clips, etc.), and is generally identical for all users. That is all users consuming the content stream from the media content provider will see the same coverage of the event.

In different circumstances, however, different users may have different preferences for those parameters of the video stream. The preferences can pertain to the content itself, or to the manner in which the content is presented. For example, depending on a user's political preferences or social viewpoint, age, gender, locations, etc., the user may wish to focus on certain aspects of the event and/or avoid other aspects. Similarly, a particular user may have a preference for certain camera angles (e.g., wide-angle vs close up), closed captioning being activated or not, a specific virtual reality (VR) or augmented reality (AR) environment being rendered, etc. In the case, where the content stream is available from only the single media content provider, these different users are limited to consuming the single content stream, regardless of whether aspects of that stream align with their individual preferences.

Aspects of the present disclosure address the above and other issues by providing interactive video content based on contextual awareness for mobile applications. In one embodiment, processing logic executing either on a user device (e.g., a mobile device) or on a server computer controlled by or accessible to the media content provider, can receive an indication of a user's content preferences and/or contextual information associated with where/when/how the user is viewing a content stream. In response, the processing logic can control one or more parameters of the content stream according to the received user content preferences and/or contextual information to create a personalized content stream, and can provide the personalized content stream to the user device. As described above, the parameters which are controlled can include the specific video, audio, VR, or AR content being presented, the camera angle, language, video quality, video size, content rating, or other parameters. The resulting personalized content stream may be unique to the particular user or may be the same as the content stream provided to other users having the same or similar content preferences and/or contextual information.

Advantages of the approaches described herein include, but are not limited to, improved performance in the content distribution system. The personalized content stream provided to the user may directly align with the user's individual preferences, resulting in an improved viewing experience. In addition, when the personalized content stream is generated remotely, the bandwidth utilized between the server computer of the media content provider and the user device is reduced as multiple different content streams need not be transmitted. This approach offloads the personalized content filtering from the user device, allowing for highly dynamic and intelligent media content, which is also of higher quality and more personalized than would be available if it was generated directly on the user device itself. Additional details regarding providing interactive video content based on contextual awareness are provided below with respect to FIG. 1-FIG. 5.

FIG. 1 is a block diagram of an exemplary network architecture 100, in which embodiments of the present disclosure may operate. In one embodiment, the network architecture 100 includes one or more host systems, such as mobile device 120A and server 120B. The host systems may communicate with each other and/or with other devices in network architecture 100 via one or more networks 150. Mobile device 120A and server 120B are representative of any number of devices which may operate to store and access data in network architecture 100. In other embodiments, network architecture 100 can include any number of stationary or mobile computers such as desktop personal computers (PCs), servers, server farms, workstations, laptops, handheld computers, personal digital assistants (PDAs), smart phones, and so forth. It is noted that some systems may include only a single host system, connected directly or remotely, to a corresponding memory sub-system. In one embodiment, a user can utilize a virtual reality (VR) or augmented reality (AR) headset 160 which is communicably coupled to mobile device 120A or directly to network 150. The VR or AR headset 160 can server as an additional display device (i.e., in addition to an internal display of mobile device 120A) on which a media content stream can be presented to the user.

In alternative embodiments, the number and type of host systems and data storage devices is not limited to those shown in FIG. 1. At various times one or more devices may operate offline. In addition, during operation, individual device connection types may change as users connect, disconnect, and reconnect to network architecture 100. Further, the systems and methods described herein may be applied to directly attached computing systems or network attached computing systems and may include a host operating system configured to perform one or more aspects of the described methods. Numerous such alternatives are possible and are contemplated.

In one embodiment, network 150 may utilize a variety of techniques including wireless connections, direct local area network (LAN) connections, wide area network (WAN) connections such as the Internet, a router, storage area network, Ethernet, and others. Network 150 may comprise one or more LANs that may also be wireless. Network 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 150. The network 150 may interface with a set of communications protocols used for the Internet such as the Transmission Control Protocol (TCP) and the Internet Protocol (IP), or TCP/IP.

In one embodiment, host systems 120A and 120B may be associated with respective memory sub-systems 110A and 110B. Memory sub-systems 110A and 110B can be any combination of storage devices and processing logic, and can include, for example, solid-state drives (SSDs), flash memory, magnetic or optical disks, tape drives, RAID arrays, EEPROM devices, storage area networks, network-attached storage, and/or any other devices capable of storing data. Additional details of the memory sub-systems are provided below with respect to FIG. 2.

Referring again to FIG. 1, host 120A and 120B may each include one or more processing devices, each comprising one or more processor cores. Each processor core includes circuitry for executing instructions according to a predefined general-purpose instruction set. The processor cores may access cache memory sub-systems for data and computer program instructions. The cache sub-systems may be coupled to a memory hierarchy including, for example, random access memory (RAM) and non-volatile memory devices. The processing devices can be configured to execute instructions of one or more customer processes and an instance of a content filtering engine 113. Although not illustrated in FIG. 1, an instance of content filtering engine 113 can execute on mobile device 120A, as well as on server 120B.

In one embodiment, the instance of content filtering engine 113 running locally on mobile device 120A or remotely on server 120B can receive an indication of a user's content preferences and/or contextual information associated with where/when/how the user is viewing or planning to view a content stream. For example, responsive to a request from the user (e.g., received via a user interface on mobile device 120A), content filtering engine 113 can identify user profile data 180 associated with the user. The user profile data 180 can be stored, for example, in memory sub-system 110A or 110B, and can include one or more content preferences defined by the user. For example, the content preferences in user profile data 180 can include the user's political preferences or social viewpoint, age, gender, content rating preferences, etc., as well as information pertaining to the context of when, where, and how the media content will be viewed, such as the device on which the media content will be viewed, the time and location where it will be viewed, and indication of other individuals who will view the media content, etc.

In one embodiment, content filtering engine 113 can control one or more parameters of a content stream according to the user content preferences and/or contextual information from the user profile data 180 to create a personalized content stream 185, and can provide the personalized content stream 185 to the mobile device 120A. Depending on the embodiment, content filtering engine 113 can control one or more of the specific video, audio, VR, or AR content being presented, the camera angle, language, video quality, video size, content rating, or other parameters. The resulting personalized content stream 185 may be unique to the particular user or may be the same as the content stream provided to other users having the same or similar content preferences and/or contextual information. Depending on the embodiment, the personalized content stream 185 can be presented on a display device of mobile device 120A, or on a separate display device, such as VR or AR headset 160, or some other display device. Additional details with respect to the operations of content filtering engine 113 are provided below.

Figure 2:
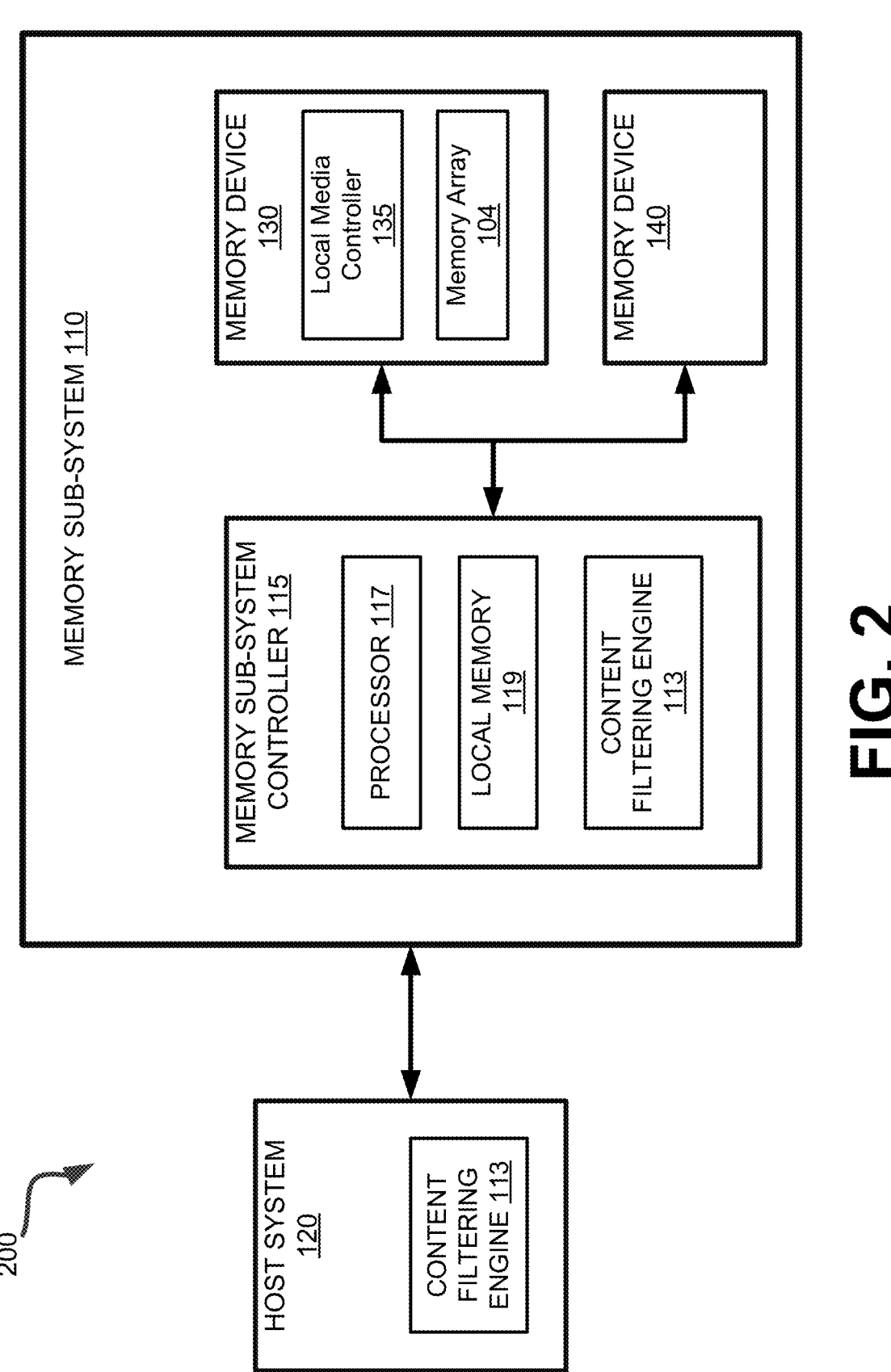
FIG. 2 illustrates an example computing system that includes a memory sub-system in accordance with some embodiments of the present disclosure.
Figure 4:
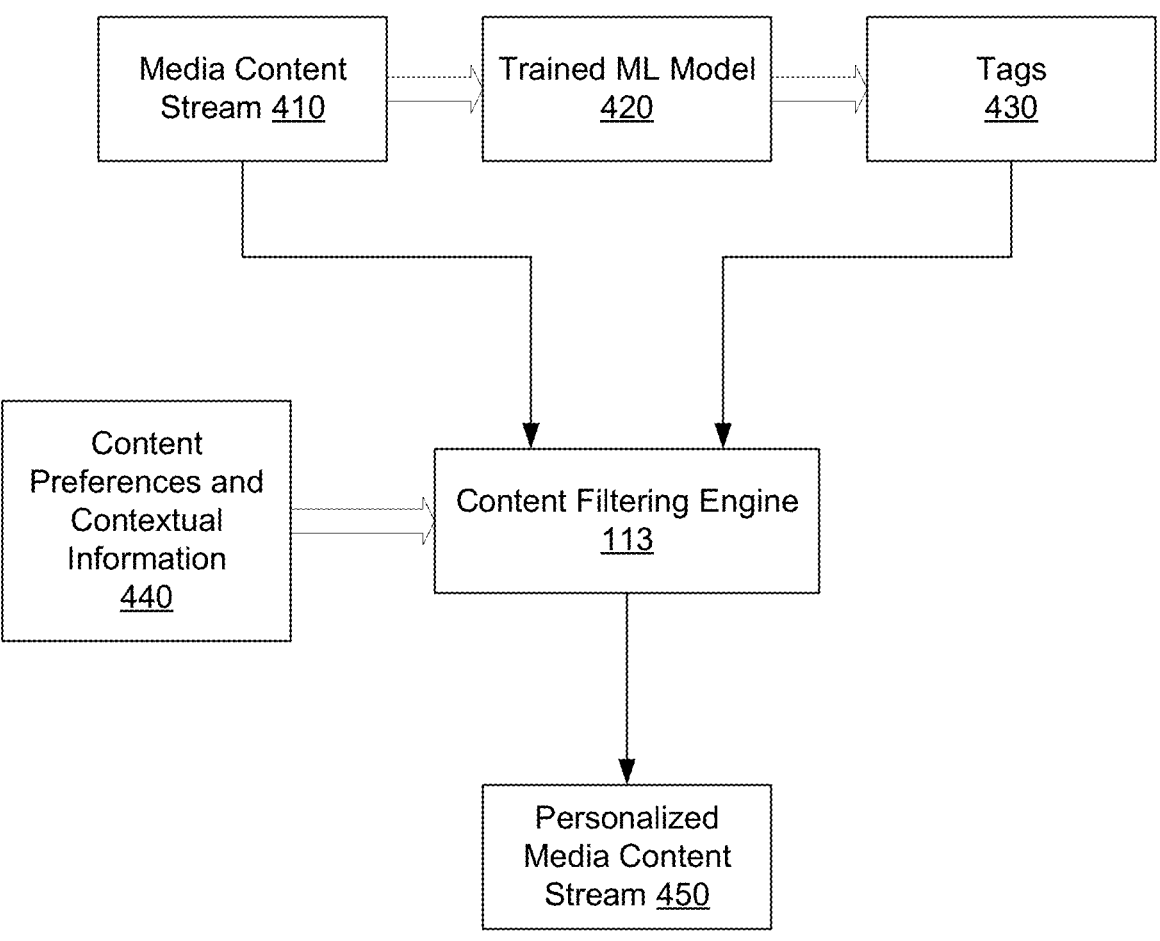
FIG. 4 is a block diagram illustrating intelligent interactive video content distribution based on contextual awareness in accordance with some embodiments of the present disclosure.

FIG. 2 illustrates an example computing system 200 that includes a memory sub-system 110 in accordance with some embodiments of the present disclosure. The memory sub-system 110 can be representative of either memory sub-system 110A or 110B of FIG. 1, and can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 200 can include a host system 120 that is coupled to one or more memory sub-systems 110. In some embodiments, the host system 120 is coupled to different types of memory sub-system 110. FIG. 2 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. The host system 120 can be representative of either mobile device 120A or server 120B of FIG. 1.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 2 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 2 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the host system 120 includes an instance of content filtering engine 113. In other embodiments, content filtering engine 113 can be executed by memory sub-system controller 115 instead. As described herein, content filtering engine 113 can receive an indication of a user's content preferences and/or contextual information associated with where/when/how the user is viewing or planning to view a content stream. For example, responsive to a request from the user, content filtering engine 113 can identify user profile data 180 associated with the user. The user profile data 180 can be stored, for example, on memory device 130 or 140 of memory sub-system 110, and can include one or more content preferences defined by the user. For example, the content preferences in user profile data 180 can include the user's political preferences or social viewpoint, age, gender, content rating preferences, etc., as well as information pertaining to the context of when, where, and how the media content will be viewed, such as the device on which the media content will be viewed, the time and location where it will be viewed, and indication of other individuals who will view the media content, etc.

In one embodiment, content filtering engine 113 can control one or more parameters of a content stream according to the user content preferences and/or contextual information from the user profile data 180 to create a personalized content stream 185, which may be temporarily stored on memory device 130 or 140 of memory sub-system 110. Content filtering engine 113 can provide the personalized content stream 185 to the host system 120. Depending on the embodiment, content filtering engine 113 can control one or more of the specific video, audio, VR, or AR content being presented, the camera angle, language, video quality, video size, content rating, or other parameters. The resulting personalized content stream 185 may be unique to the particular user or may be the same as the content stream provided to other users having the same or similar content preferences and/or contextual information. Further details with regards to the operations of content filtering engine 113 are described below.

FIG. 3 is a flow diagram of an example method of intelligent interactive video content distribution based on contextual awareness in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by content filtering engine 113 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic (e.g., content filtering engine 113) analyzes a media content stream to identify one or more tags associated with each segment of the media content stream. Depending on the embodiment, the media content stream can include video, audio, VR, or AR content, or any combination of two or more types of content. The different segments of the media content stream can each include any relevant portion of the media content stream, such as a separate frame, scene, fragment, view, camera angle, track, etc. In one embodiment, the processing logic uses a trained machine learning model to identify the one or more tags to be associated with each segment. For example, content filtering engine 113 optionally generates a feature matrix representing at least a portion of the media stream, for example by performing a number of processing operations on the media stream to extract a number of features for input into the trained machine learning model. In one embodiment, content filtering engine 113 provides the media content stream 410 itself and/or the generated feature matrix as an input to the trained machine learning model, such as trained machine learning (ML) model 420 of FIG. 4. In one embodiment, the trained machine learning model 420 may be composed of a single level of linear or non-linear operations, such as an SVM or deep network (i.e., a machine learning model that is composed of multiple levels of non-linear operations), such as a convolutional neural network. In one embodiment, the convolutional neural network is trained using a training data set formed from examples of segments of media content streams as a training input and one or more content identifiers that correctly correspond to the content of the segments as a target output. The training may result in an optimal topology of the network. Content filtering engine 113 can further obtain an output of the trained machine learning model 420, wherein the output comprises an indication of the one or more tags 430 associated with each segment of the media content stream 410.

The identified tags can be representative of the content of each segment and/or of certain attributes of each segment. For example, if the media content stream 410 pertains to news coverage of political rally and speech, the tags 430 can represent the content of an associated segment indicating whether the segment includes images of the speaker, the crowd, protestors, etc., whether the segment includes audio of the speech, of the crowd, of a commentator, etc., whether the segment includes certain topics of conversation, signs in the crowd expressing certain viewpoints, etc., whether the segment includes a wide-angle camera view, a zoomed in camera view, etc., or any other information pertaining to the segment of the media content stream 410. In other embodiments, the identified tags can indicate other and/or additional information.

At operation 310, the processing logic receives an indication of at least one of content preferences or contextual information 440 associated with a request to view the media content stream. In one embodiment, the request is received from a user device, such as mobile device 120A, and can include a request to view, listen to, or otherwise receive and playback the media content stream 410. The indication of the at least one of the content preferences or contextual information 440 associated with the request can stored as user profile data 180 on a memory device, such as memory device 130 or 140, either locally on mobile device 120A or remotely at server 120B. For example, responsive to a request from the user (e.g., received via a user interface on mobile device 120A), content filtering engine 113 can identify user profile data 180 associated with the user. The user profile data 180 can be stored, for example, in memory sub-system 110A or 110B, and can include one or more content preferences defined by the user. The content preferences in user profile data 180 can include the user's political preferences or social viewpoint, age, gender, content rating preferences, etc., and the contextual information can include information pertaining to the context of when, where, and how the media content will be viewed, such as the device on which the media content will be viewed, the time and location where it will be viewed, and an indication of other individuals who will view the media content, etc. Depending on the embodiment, the content preferences and contextual information 440 can be manually entered (e.g., by the user) and stored user profiled data 180, or can be automatically sensed and/or detected by content filtering engine 113 (e.g., based on a user's previous usage history or other detectable metrics). In other embodiments, the content preferences and contextual information 440 can indicate different and/or additional information.

At operation 315, the processing logic controls one or more parameters of the media content stream 410 according to the at least one of the content preferences or contextual information 440 to create a personalized media content stream 450. Content filtering engine 113 can control the one or more parameters of the media content stream 410 by at least one of adding, removing, or modifying a segment of the media content stream 410 in view of the one or more tags 430 associated with the segment. In one embodiment, content filtering engine 113 can control the one or more parameters of the media content stream 410 by controlling at least one of specific video content, audio content, virtual reality (VR) content, or augmented reality (AR) content being included in the personalized media content stream 450. For example, content filtering engine 113 can compare the tags 430 to the content preferences and contextual information 440 to determine whether a given segment of the media content stream 410 is a good match for a user of mobile device 120A. Content filtering engine 113 may determine that the segment is a good match for the user if the tags 430 associated with the segment match the content preferences and contextual information 440 of the user. For example, the content preferences may indicate that the user has indicated a preference for avoiding images of protesters at political rallies. Accordingly, when content filtering engine 113 determines that the tags 430 associated with a given segment indicate that protestors are shown in that segment, content filtering engine 113 can remove that segment from personalized media content stream 450. Thus the personalized media content stream 450 may be different than the original media content stream 410 as well as be different than other personalized media content streams created for other users. As indicated, other possible modification to the content of the segment are possible.

In another embodiment, content filtering engine 113 can control the one or more parameters of the media content stream 410 by controlling at least one of a camera angle, language, video quality, video size, or content rating of the personalized media content stream 450. For example, content filtering engine 113 can compare the tags 430 to the content preferences and contextual information 440 to determine whether a given segment of the media content stream 410 is a good match for a user of mobile device 120A. Content filtering engine 113 may determine that the segment is a good match for the user if the tags 430 associated with the segment match the content preferences and contextual information 440 of the user. For example, the content preferences may indicate that the user has indicated a preference for content in the English language. Accordingly, when content filtering engine 113 determines that the tags 430 associated with a given segment indicate that the audio content in a given segment is in the English language, content filtering engine 113 can maintain that segment in personalized media content stream 450. As indicated, other possible modification to the content of the segment are possible.

At operation 420, the processing logic provides the personalized media content stream 450 to a user device. In one embodiment where content filtering engine 113 is executing on server 120B, content filtering engine 113 can send the personalized media content stream 450 to mobile device 120A via network 150. In this manner, the original media content stream 410 need not traverse network 150, as only the personalized media content stream 450 is sent to mobile device 120A. In another embodiment where content filtering engine 113 is executing on mobile device 120A, content filtering engine 113 can receive the original media content stream 410 via network 150, generate the personalized media content stream 450 as described above, store the personalized media content stream 450 (e.g., in memory device 130 or 140) and optionally cause the personalized media content stream 450 to be displayed either on a display device of mobile device 120A or on a separate device, such as VR or AR headset 160.

Figure 5:
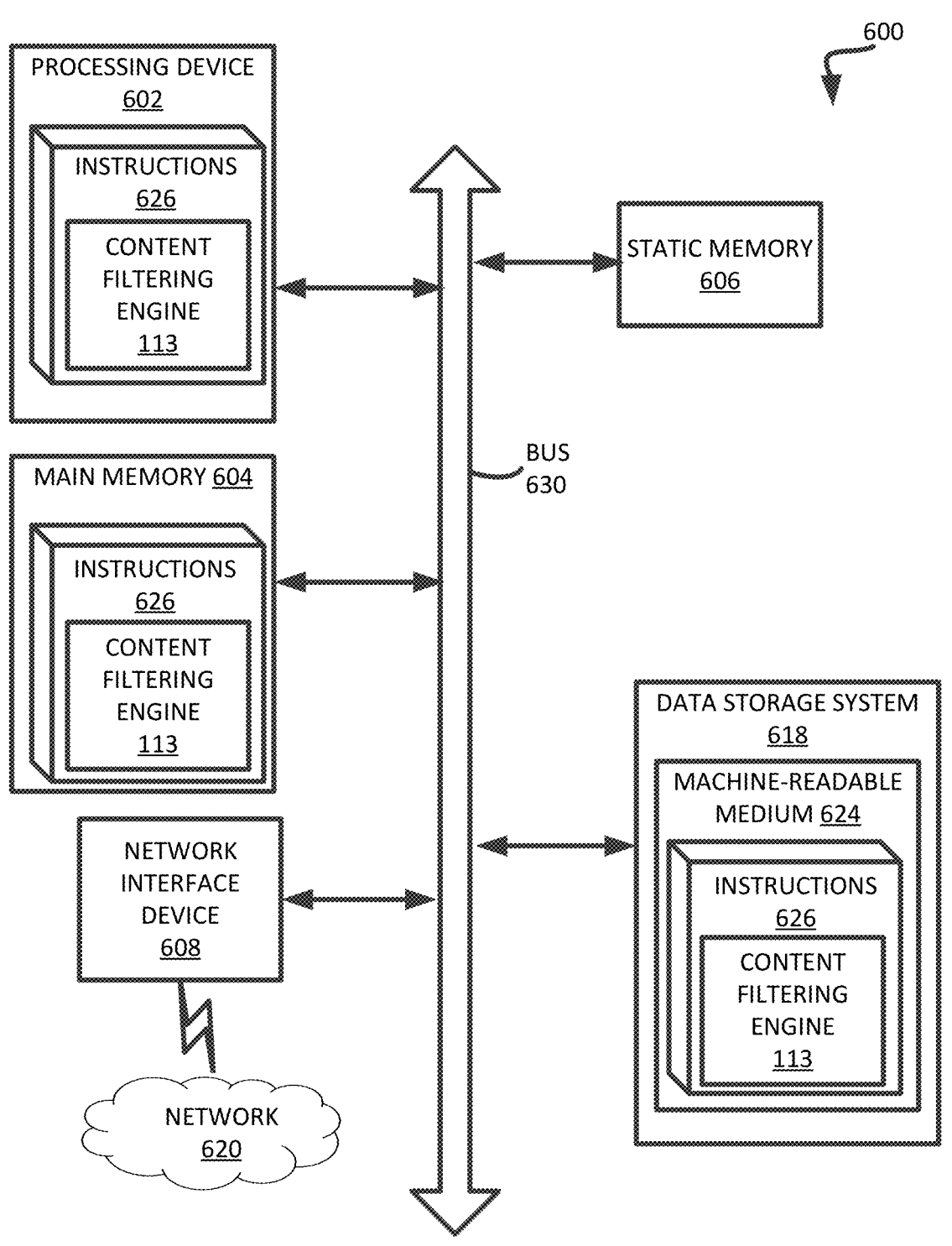
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 2) that includes, is coupled to, or utilizes a memory sub-system (e.g., the memory sub-system 110 of FIG. 2) or can be used to perform the operations of a controller (e.g., to execute an operating system to perform operations corresponding to the content filtering engine 113 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 2.

In one embodiment, the instructions 526 include instructions to implement functionality corresponding to the content filtering engine 113 of FIG. 2). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
    generating a feature matrix representing at least a portion of a media content stream comprising a plurality of segments and applying the feature matrix as an input to a trained machine learning model, wherein an output of the trained machine learning model comprises an indication of one or more tags associated with each segment of the media content stream;
    receiving, from a user device, an indication of content preferences and contextual information associated with a request to view the media content stream, wherein the contextual information comprises an indication of a device type of the user device on which the media content stream will be presented;
    prior to providing the media content stream to the user device, comparing the one or more tags associated with each segment of the media content stream to the indication of content preferences and contextual information and, based on the comparing, controlling one or more parameters of the media content stream to modify the media content stream to create a personalized media content stream; and
    providing the personalized media content stream to the user device.

2. The system of claim 1, wherein the indication of the content preferences and contextual information associated with the request is stored as user profile data on the memory device.

3. The system of claim 1, wherein the processing device is to perform operations further comprising:

analyzing the media content stream to identify the one or more tags associated with each segment of the media content stream.

4. The system of claim 3, wherein controlling the one or more parameters of the media content stream comprises at least one of adding, removing, or modifying a segment of the media content stream in view of the one or more tags associated with the segment.

5. The system of claim 1, wherein controlling the one or more parameters of the media content stream comprises controlling at least one of specific video content, audio content, virtual reality (VR) content, or augmented reality (AR) content being included in the personalized media content stream.

6. The system of claim 1, wherein controlling the one or more parameters of the media content stream comprises controlling at least one of a camera angle, language, video quality, video size, or content rating of the personalized media content stream.

7. A method comprising:
generating a feature matrix representing at least a portion of a media content stream comprising a plurality of segments and applying the feature matrix as an input to a trained machine learning model, wherein an output of the trained machine learning model comprises an indication of one or more tags associated with each segment of the media content stream;
receiving, from a user device, an indication of content preferences and contextual information associated with a request to view the media content stream, wherein the contextual information comprises an indication of a device type of the user device on which the media content stream will be presented;
prior to providing the media content stream to the user device, comparing the one or more tags associated with each segment of the media content stream to the indication of content preferences and contextual information and, based on the comparing, controlling one or more parameters of the media content stream to modify the media content stream to create a personalized media content stream; and
providing the personalized media content stream to the user device.

8. The method of claim 7, wherein the indication of the content preferences and contextual information associated with the request is stored as user profile data on a memory device.

9. The method of claim 7, further comprising:
analyzing the media content stream to identify the one or more tags associated with each segment of the media content stream.

10. The method of claim 9, wherein controlling the one or more parameters of the media content stream comprises at least one of adding, removing, or modifying a segment of the media content stream in view of the one or more tags associated with the segment.

11. The method of claim 7, wherein controlling the one or more parameters of the media content stream comprises controlling at least one of specific video content, audio content, virtual reality (VR) content, or augmented reality (AR) content being included in the personalized media content stream.

12. The method of claim 7, wherein controlling the one or more parameters of the media content stream comprises controlling at least one of a camera angle, language, video quality, video size, or content rating of the personalized media content stream.

13. A non-transitory computer-readable storage medium comprising instructions that, when executed by a processing device, cause the processing device to perform operations comprising:

generating a feature matrix representing at least a portion of a media content stream comprising a plurality of segments and applying the feature matrix as an input to a trained machine learning model, wherein an output of the trained machine learning model comprises an indication of one or more tags associated with each segment of the media content stream;

receiving, from a user device, an indication of content preferences and contextual information associated with a request to view the media content stream, wherein the contextual information comprises an indication of a device type of the user device on which the media content stream will be presented;

prior to providing the media content stream to the user device, comparing the one or more tags associated with each segment of the media content stream to the indication of content preferences and contextual information and, based on the comparing, controlling one or more parameters of the media content stream to modify the media content stream to create a personalized media content stream; and providing the personalized media content stream to a user device.

14. The non-transitory computer-readable storage medium of claim 13, wherein the indication of the content preferences and contextual information associated with the request is stored as user profile data on a memory device.

15. The non-transitory computer-readable storage medium of claim 13, wherein the processing device is to perform operations further comprising:

analyzing the media content stream to identify the one or more tags associated with each segment of the media content stream.

16. The non-transitory computer-readable storage medium of claim 15, wherein controlling the one or more parameters of the media content stream comprises at least one of adding, removing, or modifying a segment of the media content stream in view of the one or more tags associated with the segment.

17. The non-transitory computer-readable storage medium of claim 13, wherein controlling the one or more parameters of the media content stream comprises controlling at least one of specific video content, audio content, virtual reality (VR) content, or augmented reality (AR) content being included in the personalized media content stream.

18. The non-transitory computer-readable storage medium of claim 13, wherein controlling the one or more parameters of the media content stream comprises controlling at least one of a camera angle, language, video quality, video size, or content rating of the personalized media content stream.

\* \* \* \* \*